Oct. 28, 1969  O. E. MOYER  3,475,579
MACHINE FOR CARRYING METAL PANELS PAST WELDING STATIONS
Filed Sept. 7, 1967  9 Sheets-Sheet 1
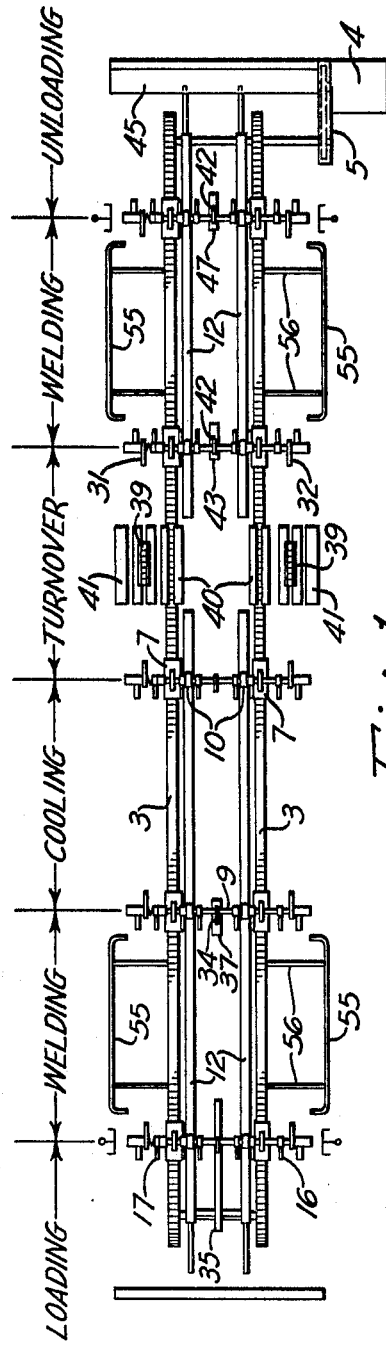
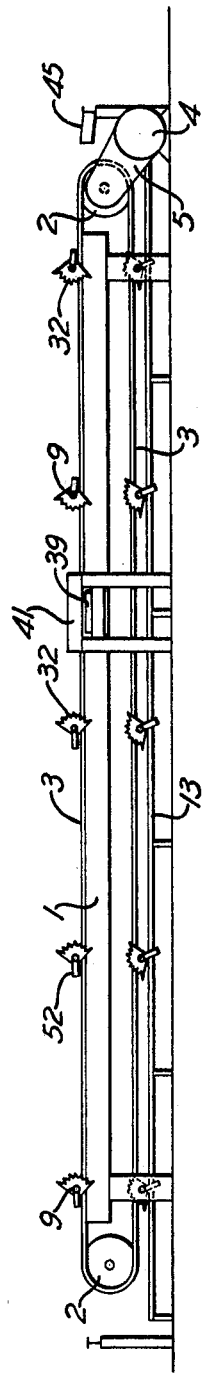
INVENTOR.
OSCAR E. MOYER
BY
Brown, Critchlow, Flick & Peckham
ATTORNEYS.

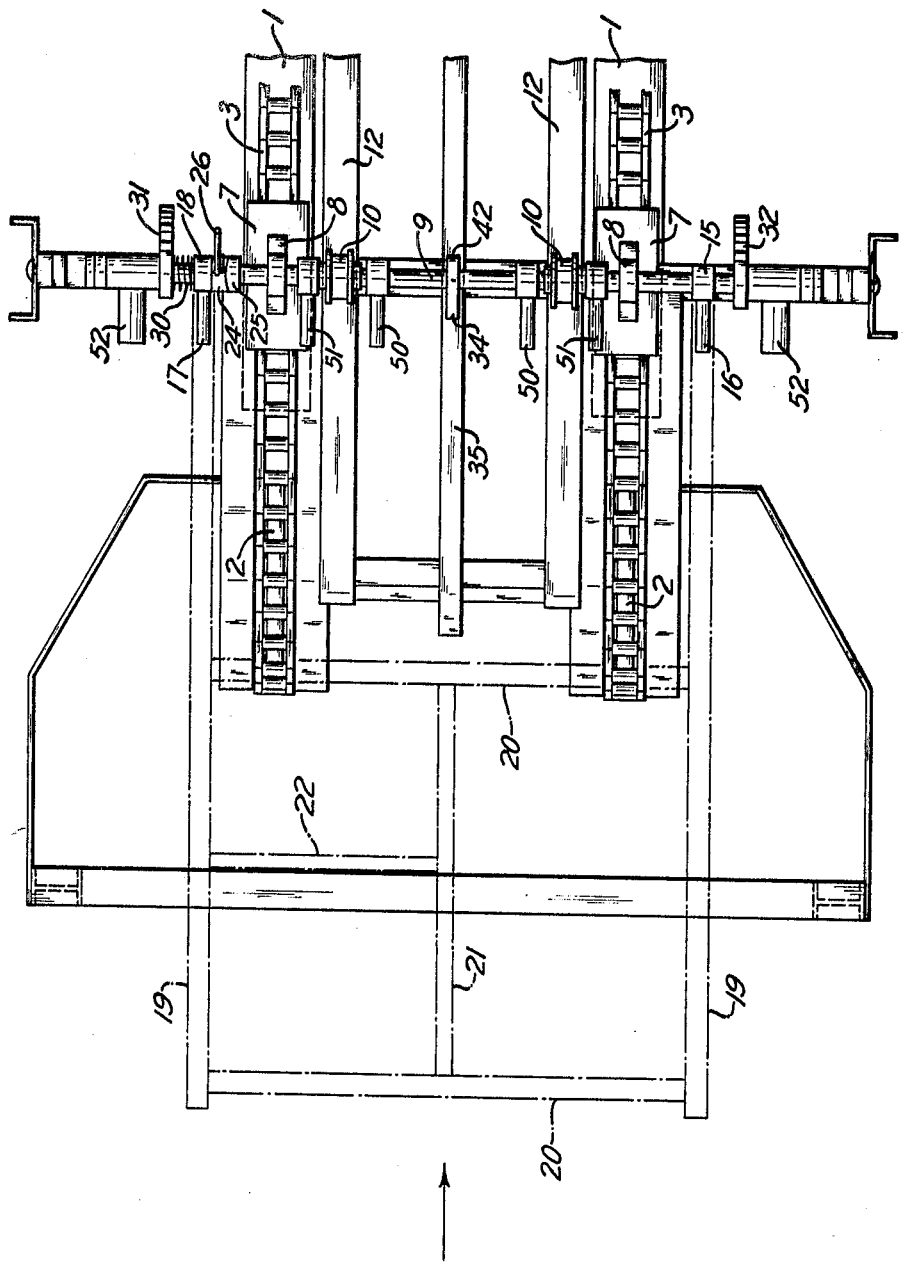

Oct. 28, 1969 O. E. MOYER 3,475,579
MACHINE FOR CARRYING METAL PANELS PAST WELDING STATIONS
Filed Sept. 7, 1967 9 Sheets-Sheet 5

INVENTOR.
OSCAR E. MOYER
BY
Brown, Critchlow, Flick & Peckham
ATTORNEYS.

Oct. 28, 1969  O. E. MOYER  3,475,579
MACHINE FOR CARRYING METAL PANELS PAST WELDING STATIONS
Filed Sept. 7, 1967  9 Sheets-Sheet 7

INVENTOR.
OSCAR E. MOYER
BY Brown, Critchlow,
Flick & Peckham
ATTORNEYS.

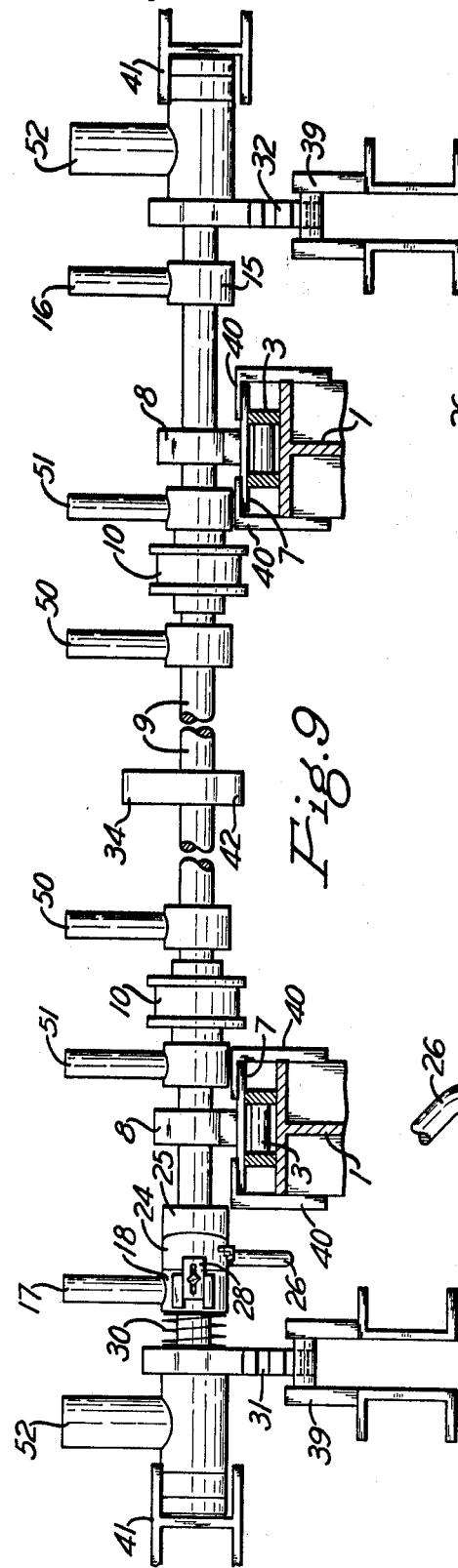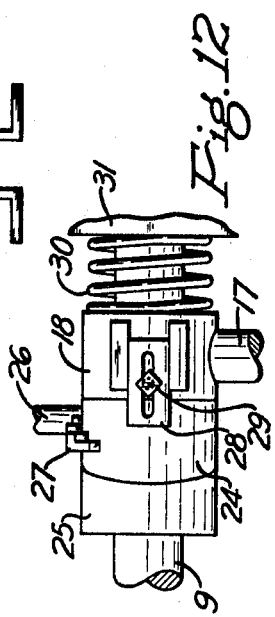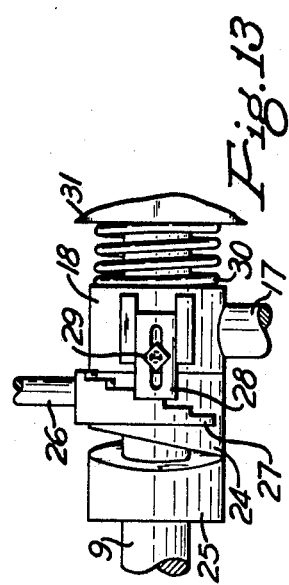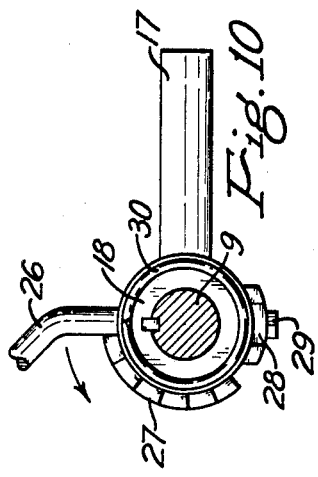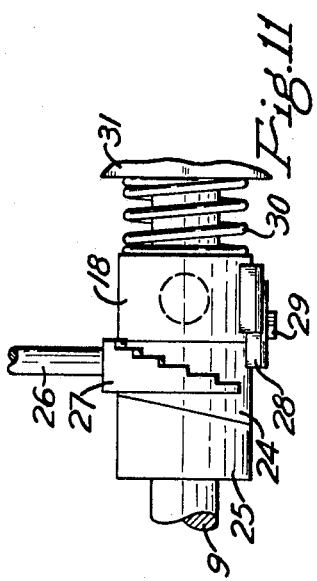

United States Patent Office 3,475,579
Patented Oct. 28, 1969

3,475,579
MACHINE FOR CARRYING METAL PANELS
PAST WELDING STATIONS
Oscar E. Moyer, Zelienople, Pa., assignor to Universal
Manufacturing Corp., Zelienople, Pa., a corporation
of Pennsylvania
Filed Sept. 7, 1967, Ser. No. 666,144
Int. Cl. B23k 9/12, 11/00; H05b 1/00
U.S. Cl. 219—80                14 Claims

ABSTRACT OF THE DISCLOSURE

A conveyor extends from a loading station forward past a pair of welding stations to an unloading station. Attached to the conveyor are uniformly spaced transverse shafts, from each of which a pair of posts projects radially for frictional engagement with the inside of the hollow legs of a metal panel to connect it to the conveyor. A pair of gears are rigidly mounted on each shaft. The conveyor is driven intermittently to carry each panel from the loading station to each welding station in succession and then to the unloading station. Between the welding stations the gears engage racks that cause the gears to rotate in order to swing a panel upwardly and forward and then down onto the conveyor in front of the racks. Welding safety gates are positioned at each of the welding stations to prevent injury to workmen operating the machine.

Background of the invention

There are metal panels which are formed from a pair of hollow legs connected by cross members. Such panels are used, for example, as the end panels of scaffolds and as the side panels of elevators employed in constructing buildings. It has been the practice to make such a panel by placing in a jig the tubular members from which it is to be constructed and then welding them together. This is a slow process, in which the welder or welders weld the panel together from one side and then have to turn it over and weld it from the other side. Each different size panel requires a different size jig, which also adds to the cost. In addition, the welders not only do the welding, but they also have to first assemble the parts in the jig and then remove the panel and stack it or place it on a conveyor.

It is among the objects of this invention to provide a machine, the use of which greatly reduce the labor involved in welding and handling metal panels, and which speeds up production with a corresponding reduction in cost.

Figure 4:
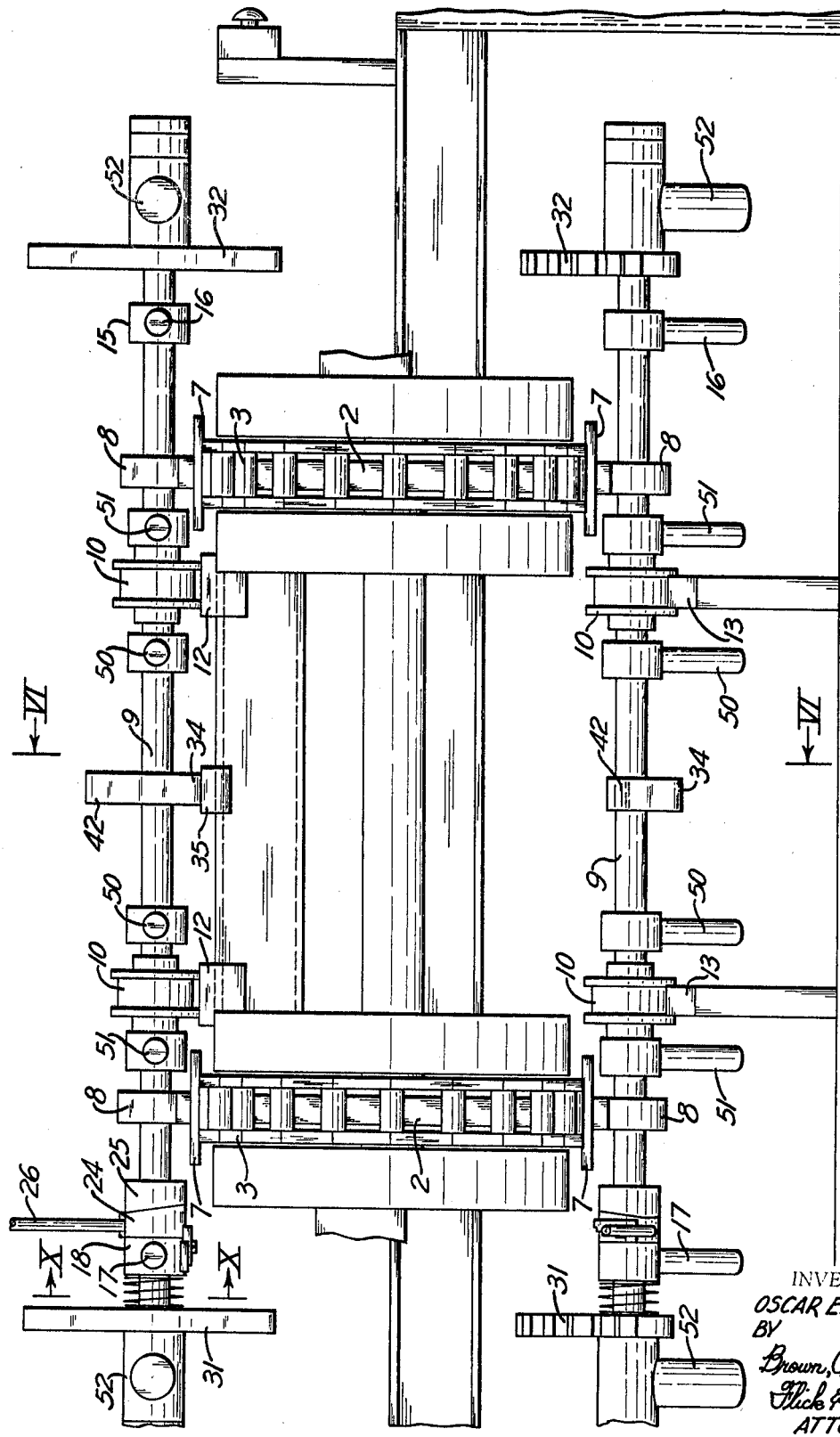
Figure 5:
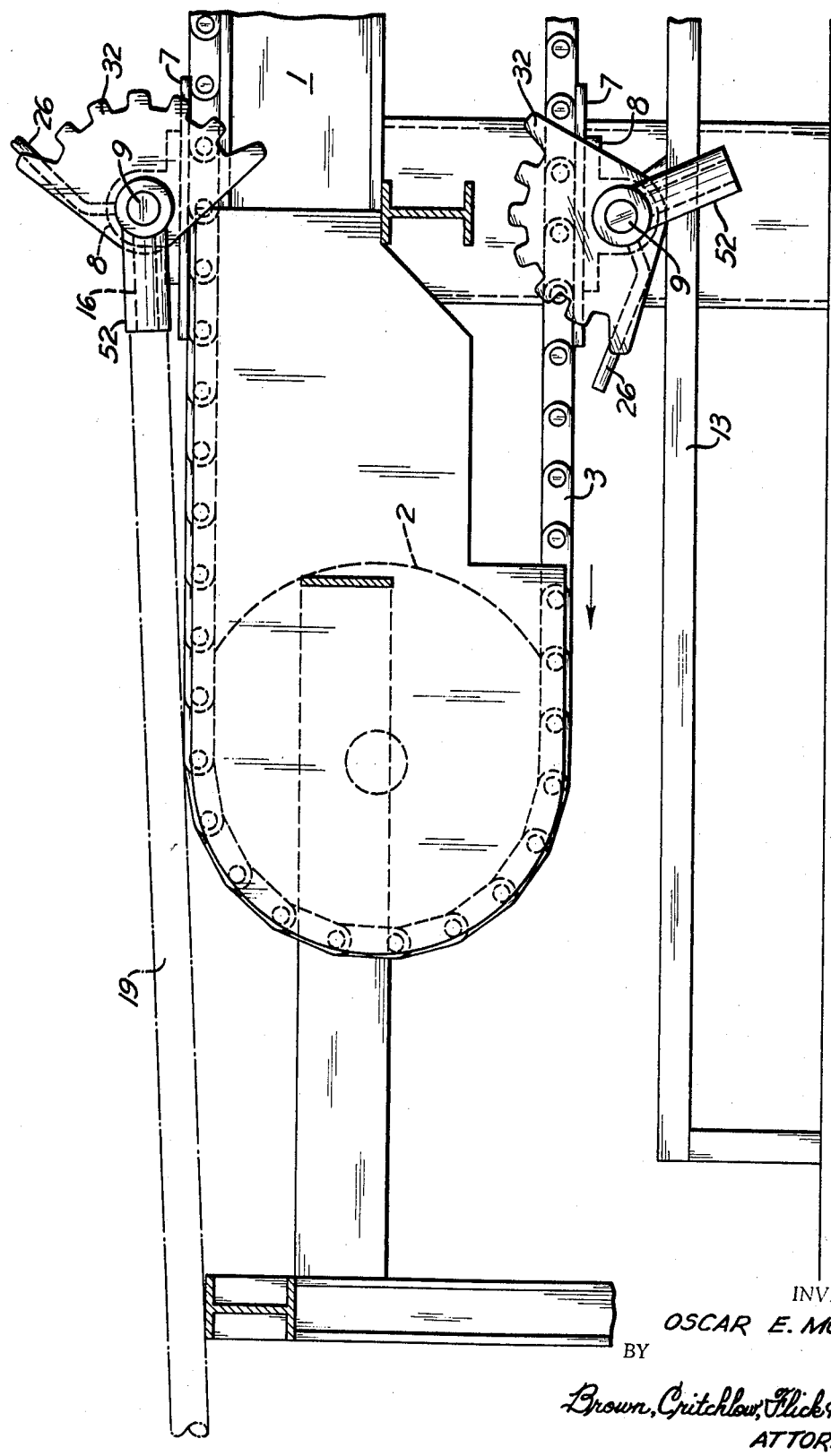
Figure 6:
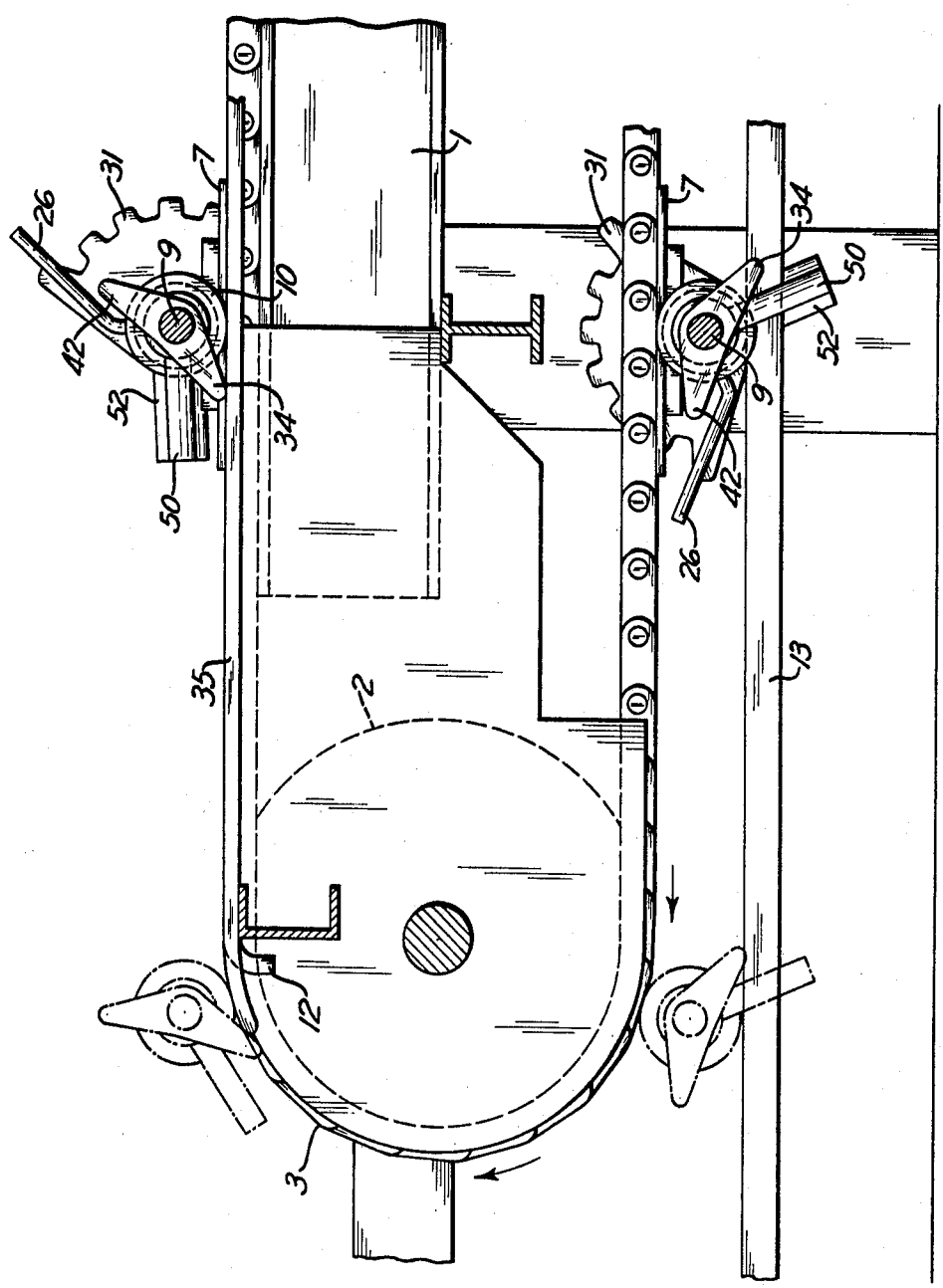
Figure 7:
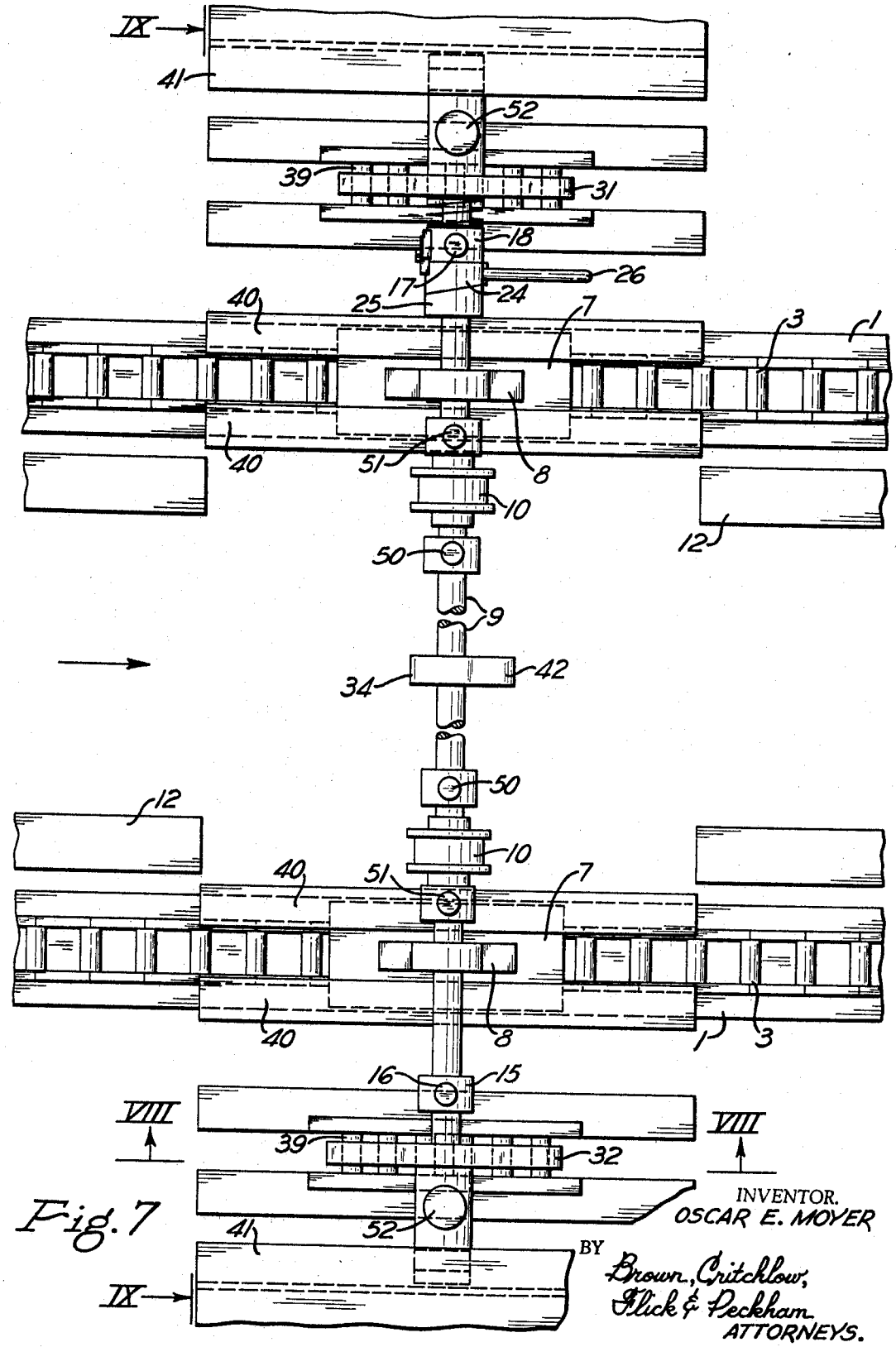
Figure 8:
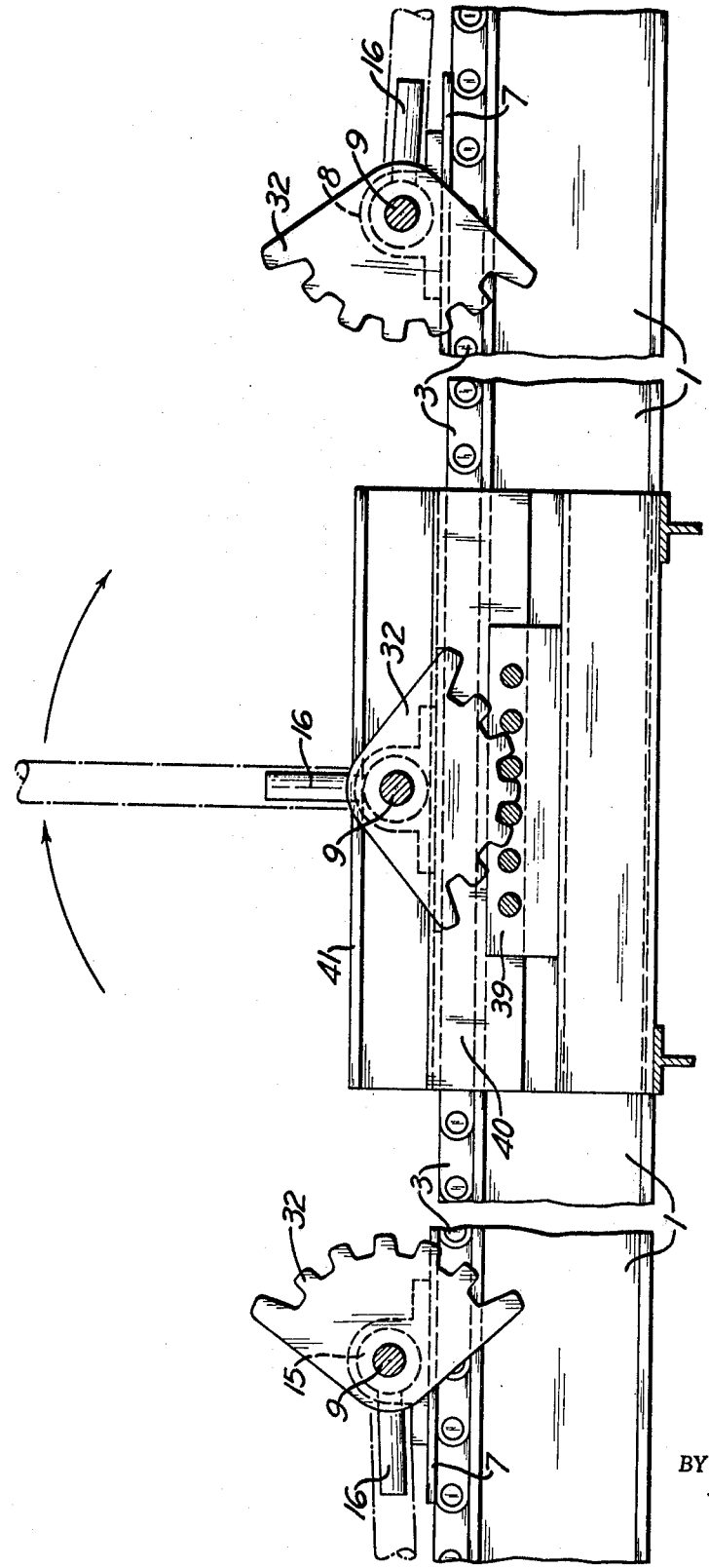
Figure 14:
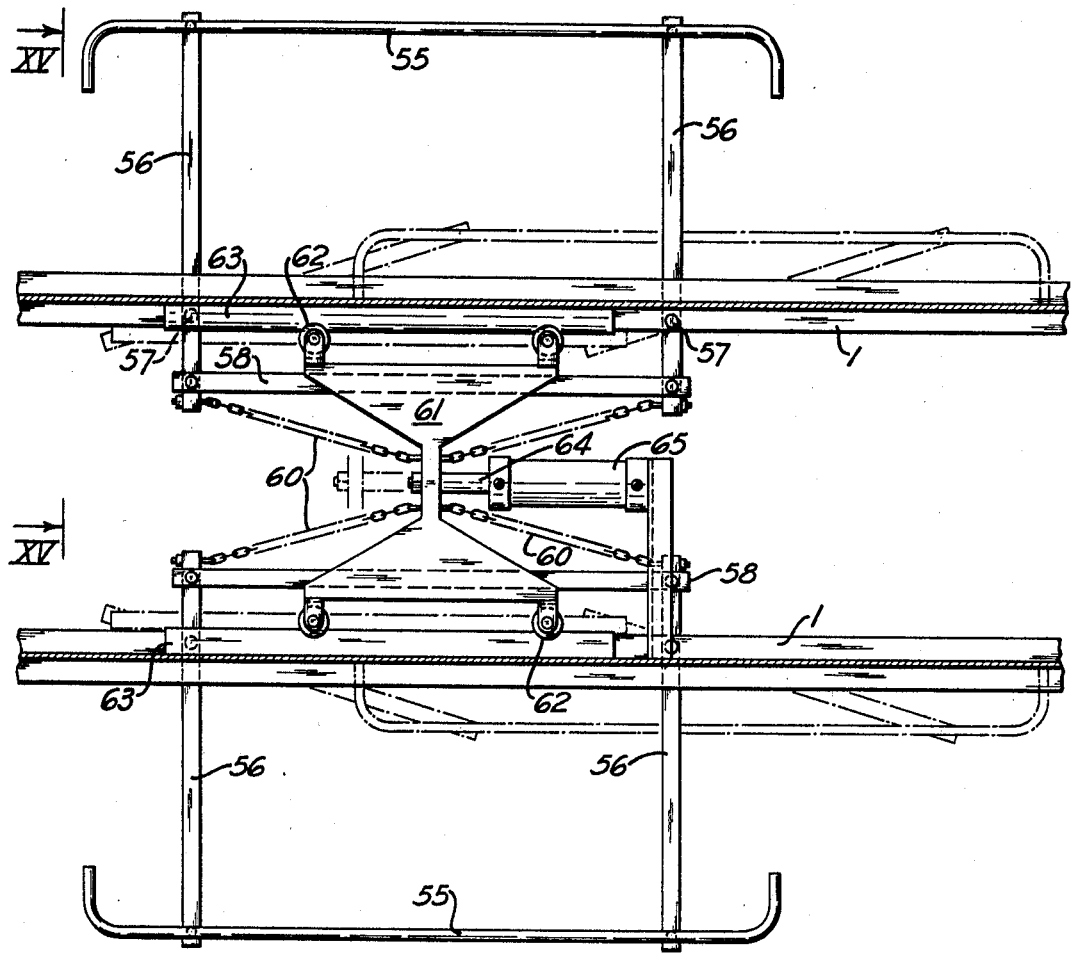
Figure 15:
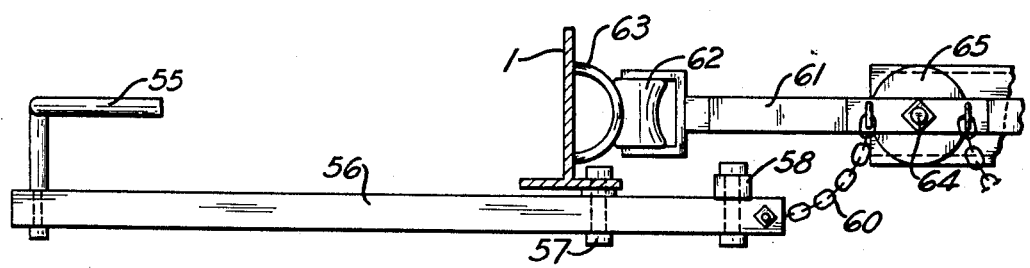

The preferred embodiment of the invention is illustrated in the accompanying drawings, in which FIG. 1 is a diagrammatic plan view of the machine;
FIG. 2 is a side view thereof with many of the parts omitted in order to make the general appearance of the machine clearer;
FIG. 3 is an enlarged fragmentary plan view of the rear or loading end of the machine;
FIG. 4 is a further enlarged end view of the rear end of the machine;
FIG. 5 is a side view, with some parts in section, of the rear end of the machine;
FIG. 6 is a vertical section taken on the line VI—VI of FIG. 4;
FIG. 7 is a plan view of the turn-over station;
FIG. 8 is a longitudinal section taken on the line VIII—VIII of FIG. 7;
FIG. 9 is a vertical cross section taken on the line IX—IX of FIG. 7;
FIG. 10 is a vertical cross section taken on the line X—X of FIG. 4;
FIG. 11 is a view from the left-hand side of FIG 10;
FIG. 12 is a bottom view of the elements shown in FIG. 11;
FIG. 13 is a view similar to FIG. 12, but showing the cam rotated about 90°;
FIG. 14 is a plan view of a pair of safety gates in safety position; and
FIG. 15 is an enlarged fragmentary vertical section taken on the line XV—XV of FIG. 14.

Referring to the drawings rotatably mounted in the ends of a long framework including parallel horizontal beams 1 are pairs of sprockets 2, around which endless chains 3 extend. The upper lengths of the chains extend along the tops of the beams. The chains form a horizontal conveyor that is driven from its front end from an electric motor 4 (FIGS. 1 and 2) and a reduction unit 5 operatively connected to the front pair of sprockets. At uniformly spaced intervals along the chains rectangular plates 7 are rigidly mounted on them. These plates support bearings 8, in each pair of which a cross shaft 9 is rotatably mouted. Rotatably mounted on each shaft between the bearings is a pair of rollers 10. The rollers along the upper length of the conveyor are supported by parallel horizontal tracks 12 mounted on the framework. The rollers along the lower or return length of the conveyor travel on a lower pair of tracks 13.

Rigidly mounted on each cross shaft near one end is a collar 15, from which a short post 16 extends radially. A matching post 17 projects from a collar 18 splined on the shaft near its opposite end. These posts are of a size that will fit snugly in the ends of the hollow legs of a metal panel, such as a scaffold panel. For example, as shown in FIG. 3, the panel may be formed from two hollow legs 19 connected by a pair of cross members 20 that in turn are connected by a central brace 21 that is connected to one leg by a cross brace 22. The parts of the panel are assembled in a jig near the conveyor and are then merely tack welded together. Such a panel is carried to the conveyor and the legs are pushed over posts 16 and 17 at the loading station, where the posts extend toward the rear end of the machine. The frictional engagement between the posts and legs holds them together so that the panel can be pulled forward by the posts when the conveyor moves.

It is a feature of this invention that means is provided for insuring that the free ends of the panel legs will be the correct distance apart in the finished panel. Accordingly, the legs of the panel are stretched apart farther than they are in the tack welded panel originally so that later when the main welds shrink, the legs will be the proper distance apart. To accomplish this, as shown in FIGS. 9 to 13, the inner end of the splined collar 18 engages a sleeve cam 24 that is rotatably and slidably mounted on the cross shaft 9. The inner end of the sleeve is disposed in a plane inclined to the axis of the shaft to form a cam surface that normally fits flat against a mating cam surface on a cam collar 25 rigidly mounted on the shaft. A handle 26 projects radially from the sleeve cam. When the sleeve is rotated on the shaft by this handle, the cam surfaces will push the splined collar and its post 17 outwardly on the shaft to stretch the panel legs apart. In order to limit the distance that the splined collar is moved so that the leg spread will be correct for the particular type of panel on the conveyor, the cam sleeve is provided with a stepped member 27 extending part way around it. The steps of this member are designed to engage the side of a stop 28 projecting part way across the sleeve from the splined collar. The stop is adjustably mounted on the collar by a stud bolt 29 so that it can be made to project different distances. The further it projects, the less the cam sleeve can be turned before one of the steps engages the stop. The splined collar is pressed against the cam sleeve by a coil spring 30, the outer end of which engages a segmental gear 31 rigidly mounted on the shaft. A like gear 32 is mounted on the opposite end of the shaft. The purpose of these gears will be explained presently.

Gravity causes the posts returning to the loading station along the lower lengths of the conveyor to point downwardly as shown in FIG. 2. To swing the posts forward and upward so that they will point toward the rear of the machine at the loading station and be in a position to receive the legs of a panel, a tongue 34 projects radially from the center of each shaft. As a shaft moves upwardly around the rear sprockets, as shown in FIG. 6, the tongue thereon strikes the rear end of a bar 35 extending forward and slides along the top of the bar. This turns the shaft enough to point its posts toward the rear end of the conveyor, which is the loading position for the posts.

After a panel has been loaded on the conveyor, the welder closest to the driving motor 4 closes an electric switch to start the conveyor moving. The conveyor pulls the panel forward until it reaches the first welding station, where the conveyor is automatically stopped by the opening of a limit switch (not shown) located at a convenient point. At this station the tongue 34 has moved part way across a copper bar 37 (FIG. 1) that forms a link in the ground for the electric welding circuit, so that the current will not be grounded through the bearings which might be ruined by it. At this first welding station a man on each side of the machine permanently welds the exposed upper portions of the panel members together. As soon as they have completed their work they step back and the conveyor operator at the front of the machine starts the conveyor again to move the half-welded panel forward to the next station. This preferably is a blank station where the panel is allowed to cool somewhat while the panel immediately following it is being welded at the first station. Then the conveyor moves ahead again to carry a third panel to the first station, to carry the second panel to the cooling station, and to carry the first panel through a turn-over station to the second welding station.

The turn-over station is another feature of this invention. It is there that each half-welded panel is swung upward and forward and down onto the conveyor again in order to turn the panel bottom side up to expose its unwelded side to the welders at the second welding station. This turning or flopping over of the panel is accomplished by gears 31 and 32 at the ends of the shaft 9. Thus, as a cross shaft moves forward after leaving the cooling station, the gears engage racks 39 rigidly mounted at opposite sides of the conveyor as shown in FIGS. 7 to 9, in view of which the gears are compelled to turn about 180°. Beside the racks there are parallel channels 40, between which each chain extends. The bearing plates are carried by the chins through these channels, which prevent any appreciable vertical and lateral movements of the chains and therefore make sure that the sprockets will engage the racks correctly. To avoid any possibility of the spockets riding up out of the racks as they turn, the ends of the shaft are held down by the upper flanges of I-beams 41 that are rigidly mounted outwardly beyond the racks.

By the time a panel has been turned over at this station it is at the second welding station and the conveyor stops again so that two welders can permanently weld the exposed upper half of the panel. This completes the welding of the panel. At this second welding station a second tongue 42 projecting radially from the center of the cross shaft engages a grounding bar 43 to form the grounding side of a welding circuit.

The conveyor then moves forward again to the unloading station, where it stops with the welded panel projecting in front of the chains and above a suitable table 45. A man at this station grips the sleeve cam handle 26 and turns the sleeve back to its normal position so that the lateral pressure on the panel legs will be released. The panel then can pulled forward off the posts and inspected and stacked. The operations just described are repeated on each successive panel so that there is a continuous flow of panels through the machine, each panel in turn being loaded, partly welded, cooled, turned over, finished welded and unloaded.

At the unloading station the tongue 42 on the cross shaft performs a further function, which is to close a switch that holds open the conveyor drive circuit until the panel at the unloading station has been removed from the conveyor, thereby preventing the conveyor from being started prematurely and causing damage. Accordingly, at the unloading station the tongue 42 presses down against a normally open switch 47 (FIG. 1) to close it and hold it closed until removal of the finished panel permits the unbalanced cross shaft to rotate under the influence of gravity and allow the switch to open again. The conveyor then can be started by the operator.

This conveyor can be designated to receive panels of several different widths by providing each cross shaft with additional pairs of posts. Thus, a pair of posts 50 can project from each shaft between its rollers, and another pair 51 project from the shaft between the rollers and bearings. The relatively narrow panels that these posts will receive generally are so constructed that they will not shrink enough from welding to require their legs to be stretched apart during welding. For wide panels, posts 52 can project from the shaft between the gears and the shaft ends. Here again there usually is no need for stretching the panels legs apart, because the wide panels are made of such large members connected in such a manner that shrinkage due to welding does not occur.

A safety feature of this invention that protects the welders from injury by the moving conveyor takes the form of safety gates that require the welders to step back away from the conveyor before it can be started in motion. The safety gates are located at both sides of each welding station. As shown in FIGS. 1, 14 and 15, each gate includes a horizontal rail 55 extending lengthwise of the conveyor beside one of the conveyor beams. Each rail is pivotally connected to the outer ends of a pair of spaced parallel arms 56 that extend inwardly beneath the adjoining beam, to which they are pivoted at 57. The inner ends of the arms are pivotally connected by a cross bar 58. A parallelogram is thus formed which allows the rail to be swung from the dotted line position in FIG. 14 close to the side of the conveyor outwardly to the full line position spaced a couple of feet or so away from it. To operate the gates, the inner ends of the parallel arms are connected by chains 60 to a carriage 61 supported by concave rollers 62 that travel along a semi-circular track 63 fastened to the inside of the beams. The central portion of the carriage is rigidly connected to a piston rod 64 that extends into a fluid pressure cylinder 65 rigidly mounted between the beams. When the piston rod projects as far as possible from the cylinder, the carriage is in such a position that the gates are folded against the sides of the conveyor. When the piston is moved to pull the rod into the cylinder, the carriage moves the parallel arms with it and thereby swings the rails outwardly into safety position. Fuid under pressure is delivered to the cylinder to move the gates to safety position whenever the conveyor operator closes the switch that starts the conveyor. Movement of the conveyor is delayed in a well-known manner until after the gates have moved out. As soon as the conveyor stops, the gates automatically swing back against the conveyor to allow the welders to approach it. The gates cannot exert much force, so they will gently push a man away from the conveyor without injuring him if he has not stepped back.

The machine disclosed herein greatly speeds up production by putting the manufacture of metal panels on an assembly line basis. There is a continuous flow of panels through the machine. Although the two tack welders also load the machine, the remaining welders do nothing but weld. They are not required to spend any time and energy in manipulating the panels because the machine carries the panels to and away from them and even turns the panels over after one side has been welded. The men who unload the machine need not be welders. This machine also concentrates the making of the panels in a relatively small area. Formerly, each welder or pair of welders had a jig to which the panel parts had to be carried and from which one welded panels were removed and stacked or carried away, all of which required considerable floor space and a lot of moving around.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A machine for carrying past a pair of welding stations a metal panel having a pair of hollow legs connected by cross members, said machine comprising parallel endless chains forming a horizontal conveyor extending from a loading station forward past said welding stations to an unloading station, uniformly spaced shafts extending across the chains, bearing for the shafts mounted on said chains, a pair of posts projecting radially from each shaft at longitudinally spaced points for frictional engagement with the inside of the legs of a panel to connect it to the conveyor, means holding the posts against rotation on the shaft, a gear rigidly mounted on each shaft, means for driving the conveyor intermittently to carry each panel from the loading station to each welding station in succession and then to the unloading station, and a rack rigidly mounted beside the chains between the welding stations for engagement by said gear to cause it to rotate as it passes over the rack to swing a panel upwardly and then down onto the conveyor in front of the rack.

2. A machine according to claim 1, including means for forcing one of said posts on each shaft laterally away from the other post after a panel has been mounted on the posts, whereby to spread the panel legs a predetermined amount.

3. A machine according to claim 1, in which said holding means for one of the posts on each shaft is a collar splined on the shaft, and said forcing means include a cam rotatably mounted on the shaft at the inner end of said collar for forcing the collar outwardly on the shaft.

4. A machine according to claim 1, in which said holding means for one of the posts on each shaft is a collar splined on the shaft, and said forcing means include a cam rotatably mounted on the shaft at the inner end of said collar for forcing the collar outwardly on the shaft, and adjustable means for limiting the degree of rotation of said cam to control the distance the collar can be moved by it.

5. A machine according to claim 4, in which said adjustable means include a series of steps extending part way around said cam, a stop extending from said collar across the cam, and means connecting the stop to the collar for adjustment lengthwise of the shaft.

6. A machine according to claim 1, including a tongue projecting radially from each shaft, and a track extending lengthwise of the conveyor at the loading station for engagement by each tongue to swing said posts into panel-receiving position.

7. A machine according to claim 1, including hold-down members extending lengthwise of the conveyor beside said rack to keep the ends of the shafts from rising as they pass the rack.

8. A machine according to claim 1, including plates projecting laterally from the chains at said bearings, and guides for said plates extending lengthwise of the conveyor beside said rack.

9. A machine according to claim 1, including a pair of tongues projecting radially from each shaft, and an electrical grounding bar extending lengthwise of the conveyor at each welding station, one of said tongues being positioned to engage the bar at one welding station and the other tongue being positioned to engage the other bar at the other welding station.

10. A machine according to claim 1, in which said conveyor-driving means is operated through an electric circuit, a tongue projects radially from each shaft, and an electric switch at the unloading station controls said circuit, said switch being actuated by a tongue at the unloading station to hold said circuit open while there is a panel at that station, removal of the panel permitting the shaft carrying said one tongue to turn and allow the switch to reverse.

11. A machine according to claim 1, including safety gates at each welding station located close to the sides of the conveyor while the conveyor is stationary, and means for moving the gates outwardly to operative position just before the conveyor starts to move.

12. A machine according to claim 11, in which said gate-moving means include a carriage movable lengthwise of the conveyor, means operatively connecting the carriage with the adjoining gates, and means for reciprocating the carriage.

13. A machine according to claim 11, in which each gate includes a horizontal rail extending lengthwise of the conveyor, a pair of parallel arms having outer ends pivotally connected to the rail on vertical axes, means pivotally supporting the arms on vertical axes, and means connecting said gate-moving means with the inner ends of the arms to swing them lengthwise of the conveyor, whereby said rail can be swung outwardly away from the conveyor to said operative position.

14. A machine according to claim 11, in which each gate includes a horizontal rail extending lengthwise of the conveyor, a pair of parallel arms having outer ends pivotally connected to the rail on vertical axes, means pivotally supporting the arms on vertical axes, and said gate-moving means include a carriage movable lengthwise of the conveyor, means for reciprocating the carriage, and tension means connecting the carriage with the inner ends of said arms to swing them lengthwise of the conveyor.

References Cited

UNITED STATES PATENTS

| | | | |
|---|---|---|---|
| 1,258,662 | 3/1918 | Donnelly | 198—33 |
| 1,989,977 | 2/1935 | Galson. | |
| 2,142,109 | 1/1939 | Burke | 219—159 X |
| 3,019,326 | 1/1962 | Kary | 219—56 |
| 3,247,963 | 4/1966 | Fehely | 198—33 X |
| 3,306,427 | 2/1967 | Spencer | 198—33 |
| 3,380,570 | 4/1968 | Jordan | 198—33 |
| 3,427,699 | 2/1969 | Cape | 219—79 X |

JOSEPH V. TRUHE, Primary Examiner

B. A. STEIN, Assistant Examiner

U.S. Cl. X.R.

198—33; 219—159